United States Patent
Reichle (10) Patent No.: US 10,647,304 B2
(45) Date of Patent: May 12, 2020

(54) ANTI-FOGGING SYSTEM FOR SINGLE ENGINE AIRCRAFT

(71) Applicant: Carl Heinz Reichle, Prince Albert (CA)

(72) Inventor: Carl Heinz Reichle, Prince Albert (CA)

(*) Notice: Subject to any disclaimer, the term of this patent is extended or adjusted under 35 U.S.C. 154(b) by 1061 days.

(21) Appl. No.: 13/803,154

(22) Filed: Mar. 14, 2013

(65) Prior Publication Data

US 2014/0273788 A1  Sep. 18, 2014

(51) Int. Cl.
*B60S 1/02* (2006.01)
*B60S 1/54* (2006.01)
*B64D 13/08* (2006.01)
*B64D 13/00* (2006.01)

(52) U.S. Cl.
CPC ............... *B60S 1/54* (2013.01); *B64D 13/08* (2013.01); *B64D 2013/003* (2013.01); *Y02T 50/44* (2013.01)

(58) Field of Classification Search
CPC .................................... B60S 1/023; B60S 1/54
See application file for complete search history.

(56) References Cited

U.S. PATENT DOCUMENTS

| | | | |
|---|---|---|---|
| 1,673,149 A | 6/1928 | Kohn et al. | |
| 1,996,019 A | 3/1935 | Hueber | |
| 2,214,165 A * | 9/1940 | Fink | B60S 1/54 |
| | | | 454/121 |
| 2,265,168 A | 12/1941 | Huffman | |
| 2,333,818 A | 11/1943 | Raney | |
| 2,435,277 A * | 2/1948 | Holthouse | F02N 19/02 |
| | | | 237/12.3 C |
| 2,523,923 A | 9/1950 | Rodert | |
| 2,817,282 A * | 12/1957 | Dolison | B60H 1/3229 |
| | | | 454/139 |
| 2,876,998 A | 3/1959 | Csabi | |
| 2,984,415 A * | 5/1961 | Wilfert | B60H 1/247 |
| | | | 237/12.3 A |
| 3,096,938 A | 7/1963 | Cole et al. | |
| 3,278,121 A | 10/1966 | Komenda | |

(Continued)

FOREIGN PATENT DOCUMENTS

| | | | |
|---|---|---|---|
| JP | 04368255 | | 12/1992 |
| JP | 2003-276431 A | * | 9/2003 |
| JP | 2004-26038 A | * | 1/2004 |

OTHER PUBLICATIONS

Fujita, et al, JP2004-026038A English machine translation, Jan. 2004.*

*Primary Examiner* — Grant Moubry
*Assistant Examiner* — Phillip Decker
(74) *Attorney, Agent, or Firm* — Daniel P. Burke & Associates, PLLC; Daniel P. Burke (57) ABSTRACT

Anti-fogging systems for air-cooled, piston powered single engine aircraft which effectively prevent windshields from fogging during cold weather by directing a forceful stream of unheated, ambient air in a direction which intercepts exhaled air from an aircraft occupant to impede the moist exhaled air from directly reaching the windshield and condensing on the windshield. The disclosed systems keep the windshield of a small air-cooled, piston powered single engine aircraft from fogging while permitting a pilot to perform his pre-flight preparation, taxi and takeoff in cold climates.

17 Claims, 11 Drawing Sheets

(56) References Cited

U.S. PATENT DOCUMENTS

| | | | | |
|---|---|---|---|---|
| 3,301,161 A * | 1/1967 | Attwood | B60H 1/00042 | 454/127 |
| 3,366,336 A * | 1/1968 | Neuschwanger | B60S 1/52 | 237/12.3 B |
| 3,427,950 A * | 2/1969 | Pardy | B60H 1/00071 | 454/126 |
| 3,583,658 A * | 6/1971 | Herweg | B64D 13/08 | 244/118.5 |
| 3,908,900 A | 9/1975 | Smith | | |
| 3,971,511 A | 7/1976 | Casey | | |
| 4,004,126 A * | 1/1977 | Boaz | B60S 1/54 | 454/127 |
| 4,490,989 A | 1/1985 | Keen | | |
| 4,693,172 A * | 9/1987 | Harvey | G05D 22/02 | 454/121 |
| 4,711,159 A * | 12/1987 | Armbruster | B60H 1/247 | 454/137 |
| 4,814,579 A | 3/1989 | Mathis et al. | | |
| 4,864,919 A * | 9/1989 | Schulz | B60H 1/345 | 454/127 |
| 5,014,606 A * | 5/1991 | Steiner | B60S 1/54 | 454/121 |
| 5,097,563 A * | 3/1992 | Cowan | B60S 1/54 | 454/123 |
| 5,114,382 A | 5/1992 | Steiner | | |
| 5,140,719 A * | 8/1992 | Cowan | B60S 1/54 | 454/123 |
| 5,327,744 A | 7/1994 | Frawley et al. | | |
| 5,447,469 A * | 9/1995 | Dausch | B60H 1/00057 | 454/121 |
| 5,632,673 A | 5/1997 | DeRees | | |
| 5,954,577 A * | 9/1999 | Meckler | B60H 3/0625 | 454/158 |
| 5,987,216 A | 11/1999 | Krug | | |
| 6,012,515 A | 1/2000 | Stubbendorff et al. | | |
| 6,616,522 B2 | 9/2003 | Colinet | | |
| 7,017,828 B2 | 3/2006 | Reichle | | |
| 2005/0002658 A1* | 1/2005 | Kelley | B60H 1/00564 | 392/379 |
| 2006/0283968 A1* | 12/2006 | Reichle | B64D 13/00 | 237/28 |
| 2008/0290081 A1* | 11/2008 | Biddell | B60S 1/026 | 219/203 |
| 2011/0105014 A1* | 5/2011 | Tseng | B60S 1/026 | 454/251 |
| 2011/0266075 A1* | 11/2011 | Guzelimian | B60K 16/00 | 180/2.2 |

* cited by examiner

ANTI-FOGGING SYSTEM FOR SINGLE ENGINE AIRCRAFT

The present invention is directed to anti-fogging systems for small, air cooled, piston powered, single engine aircraft which temporarily prevents warm, moist exhaled air from directly reaching a cold windshield of an aircraft with an intercepting, forceful stream of ambient air. The disclosed systems prevent fogging by carrying moist exhaled air away from the windshield and aggressively mixing it with cabin air. The present invention is particularly beneficial before the engine has sufficiently heated up e.g. during preflight checks, taxiing, and takeoff in cold climates.

BACKGROUND

Various systems have been suggested for defrosting the windshield of an aircraft, i.e. for removing frost after the frost has formed on the windshield. Large planes, commercial aircraft, jet aircraft and military helicopters are equipped with very extensive heating, defogging and air conditioning systems for the cabin, whether in flight or on the ground. Multi-engine, piston powered airplanes have auxiliary gas powered heaters which are usually ignited immediately after the engines are started. Such heaters include a combustion chamber, a heat exchange system and a battery-powered blower. Soon after being ignited, the auxiliary heater begins delivering heat to the cabin including the windshield's defrosting system without the need for aircraft motion or ram effect.

Small piston powered, single engine aircraft, however, are normally equipped with simple systems which, when in flight, take in outside air and the ram speed of the aircraft pushes the ambient air past a portion of the aircraft's exhaust system where it is heated and then through ducts into the cabin. Unfortunately, when such an aircraft is not in flight, there is virtually no ram air pushing through the heating system. Such systems also require sufficient heat from the engine. Also, some single engine, piston driven aircraft have no defrost provisions. This can create serious visibility problems in cold, wintry conditions, particularly in northern climates such as those found in Canada or the northern United States. During pre-flight preparations, engine start up, warm up, taxiing, and takeoff prior to flight, the cabin is not usually heated or is heated insufficiently by existing heating systems to defrost the windshield. During cold months, this can cause a very serious problem since the pilot's visibility of the outside can be poor because of fogging windows. During taxi and takeoff, this can lead to serious accidents.

Systems have been suggested for enhancing the heat supply to the defrosting systems for small aircrafts. For example, the present inventor disclosed a blower assisted heating and defogging system for small aircraft in U.S. Pat. No. 7,017,828 which utilizes heated air from a muffler shroud to heat external air drawn from outside the aircraft with the blower.

Thus, various systems have addressed the issue of clearing frost from a windshield, but have not addressed the problem of fogging windshields by impeding moist exhaled air from reaching a windshield and thereby preventing frost from forming on the windshield in the first instance.

SUMMARY OF THE INVENTION

Disclosed are anti-fogging systems for small, air-cooled, piston-powered single engine aircrafts which temporarily, effectively prevent windshields from fogging during cold weather by directing a forceful stream of unheated ambient air in a direction which intercepts exhaled air from an aircraft occupant to prevent the exhaled air from directly reaching the windshield. An embodiment of the present invention has been found useful to effectively keep the windshield of a small, air-cooled, piston powered single engine airplane from fogging while permitting a pilot to perform his pre-flight checklist, taxi and takeoff. The present invention significantly enhances the safety of small, air-cooled, piston powered single engine aircraft operation in cold climates commonly found in Canada and northern parts of the United States during cold seasons. Unlike previously disclosed systems which are designed to remove frost which has already formed on a windshield, the disclosed embodiments provide inexpensive systems designed to prevent moist, exhaled air from directly reaching a cold windshield by intercepting the exhaled air with a forceful stream of ambient air before the exhaled air reaches the windshield.

One preferred embodiment comprises an anti-fogging system in an air-cooled, piston powered single engine airplane, where the airplane comprises a cabin, a dashboard, an instrument panel comprising a rearwardly facing surface, and a windshield. The dashboard is typically positioned below at least most of the windshield. The anti-fogging system comprises at least one electrically powered blower preferably located in the cabin. The blower is connected to at least one air conduit to form a continuous air passage from an inlet end to an outlet end. The inlet end of the air passage is located in the cabin, preferably below the dashboard, to receive ambient cabin air. The outlet end of the air passage is configured to direct a forceful stream of the ambient air received from the inlet end rearwardly of the windshield. The forceful stream is most preferably directed upwardly in the cabin. The system and specifically the air passage do not comprise a heater or other mechanism for altering the temperature or the humidity of the ambient air. This minimizes the cost and weight of the disclosed systems. In operation, the blower creates a forceful stream of ambient air which exits the outlet and directly intercepts exhaled air from the pilot and/or other occupant to prevent warm, moist exhaled air from directly reaching the windshield. By positioning the inlet of the air passage below the dashboard, the inlet draws in relatively dry, ambient air which has a dew point below the temperature of the windshield as compared to air that is exhaled by the pilot/passengers which has a higher moisture content and would otherwise condense on the windshield when the temperature of the windshield is below the dew point for the exhaled air reaching the windshield.

DETAILED DESCRIPTION

The disclosed embodiments provide anti-fogging systems which utilize untreated ambient air to forcefully intercept the warm, moist air exhaled by the occupant(s) to prevent it from directly reaching a cold windshield of the aircraft. As used herein, the term "occupants" includes pilots and passengers. As used herein the term "untreated ambient air" is used to indicate that the air is not heated or dehumidified, such as by a heating coil or compressor. The ambient air is preferably drawn from an area somewhat remote from the occupants exhaled breath, and most preferably from a location lower than the dashboard. One disclosed embodiment comprises a small, air-cooled, piston powered single engine airplane. Another disclosed embodiment comprises a kit for use in an air-cooled, piston powered single engine aircraft.

Figure 1:
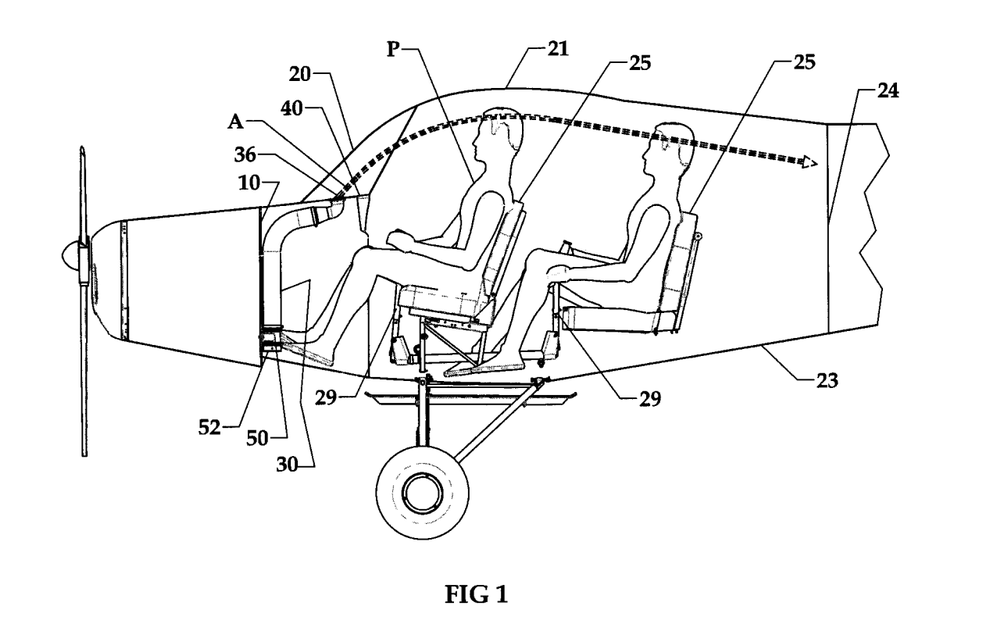
FIG. 1 is a cross-sectional view of one embodiment of the present invention.

FIG. 1 is a cross-sectional view of a forward portion of an exemplary air cooled, piston powered, single engine airplane of the type for which the disclosed anti-fogging systems are particularly useful. FIG. 1 illustrates the passenger portion of a cabin of a Piper Super Cub which includes two tandem seats 25, each comprising a control stick 29. The cabin is generally defined by a firewall 10 and windshield 20 in the forward region, the fuselage roof 21 above, a storage compartment wall 24 in the rear, and the fuselage floor 23, plus the sidewalls and doors which are not shown in the figures. It will be appreciated that cabins of small piston powered single engine aircraft, come in various shapes and sizes. Some Piper Super Cubs do not have storage compartment walls 24, in which case the cabin would include a storage area located further aft of the illustrated wall 24. In this illustrated embodiment, the cabin is only one seat wide, but the present invention is applicable to air-cooled, piston powered, single engine aircraft having larger cabins such as those with side-by-side seating.

Figure 2:
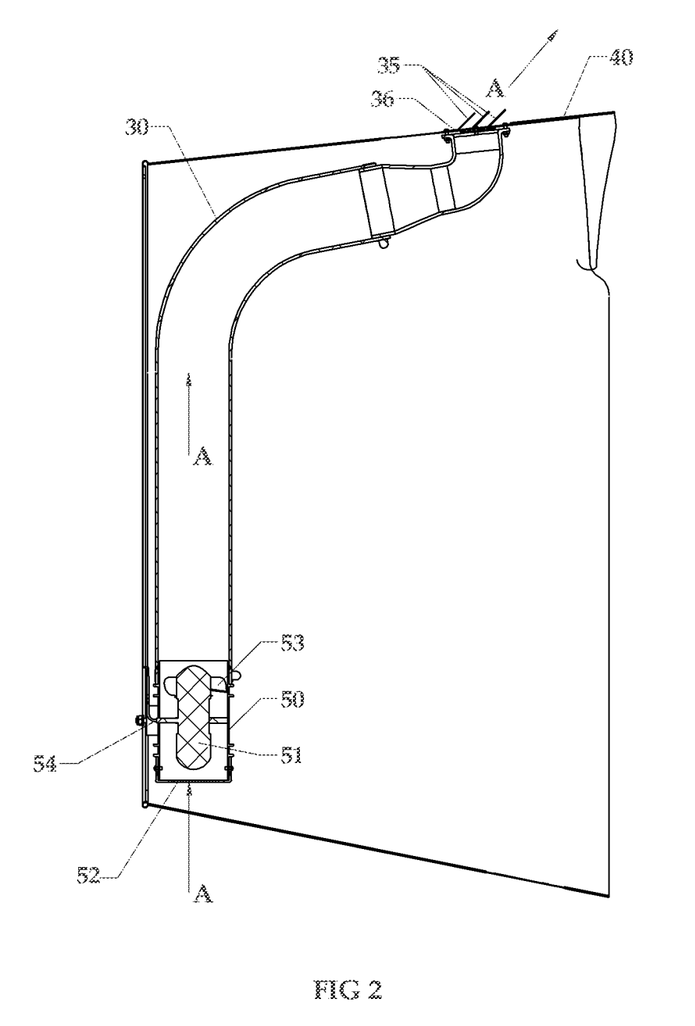
FIG. 2 is a cross-sectional view of a blower and air conduit connected to a firewall and dashboard.
Figure 3:
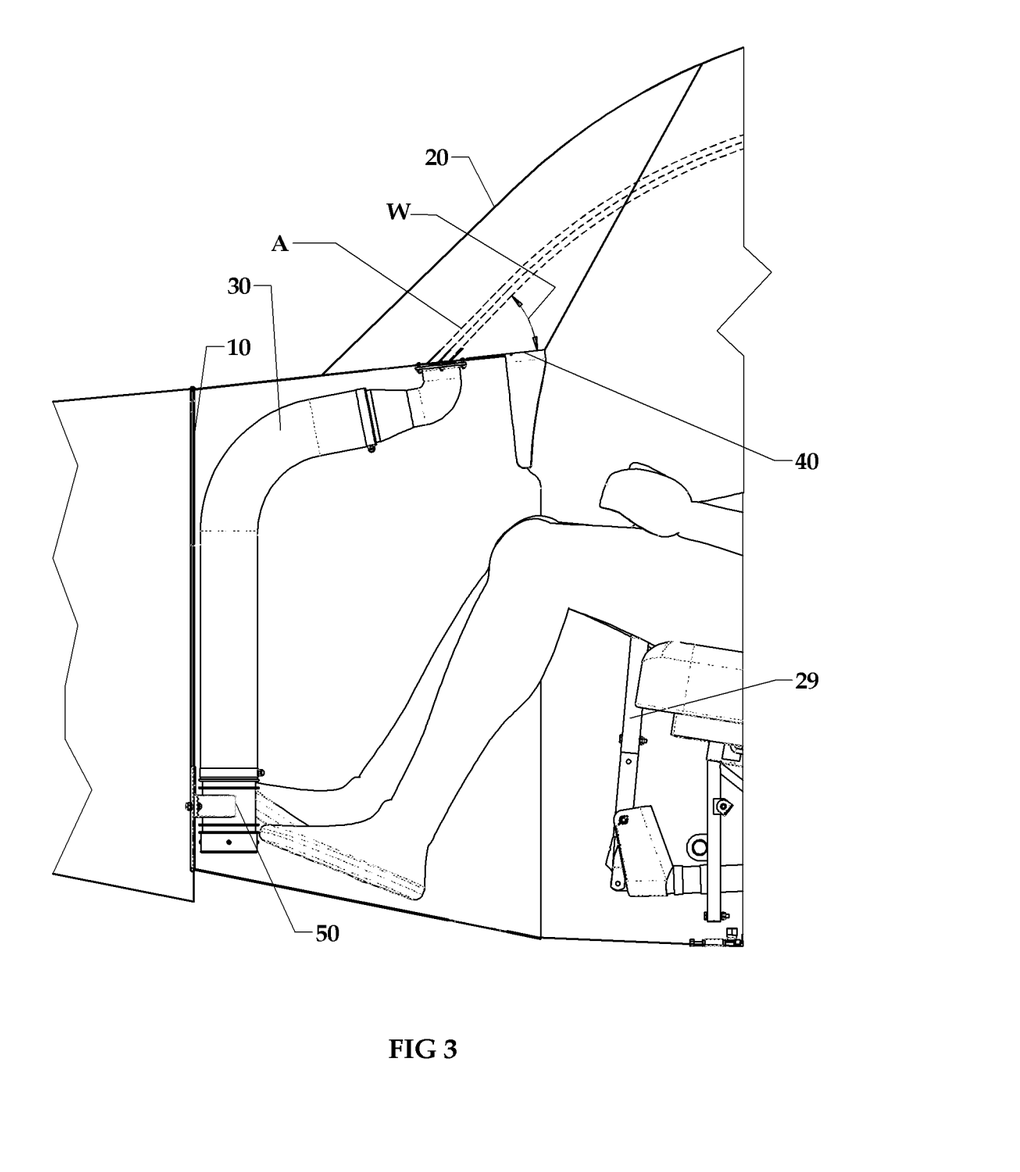
FIG. 3 is a close-up view of the embodiment shown in FIG. 1.

With reference to FIGS. 1-3, the illustrated anti-fogging system comprises a blower 50 having an inlet 52 and an air conduit 30. The air conduit 30 has an outlet 36 which in this illustrated embodiment is secured to dashboard 40. The blower 50 and air conduit 30 are mounted on the aft side of firewall 10. The illustrated air conduit 30 is generally S-shaped and extends from the outlet of blower 50 upwardly adjacent to the firewall 10 and through the dashboard 40 with the outlet 36 secured to the dashboard 40.

Figure 12:
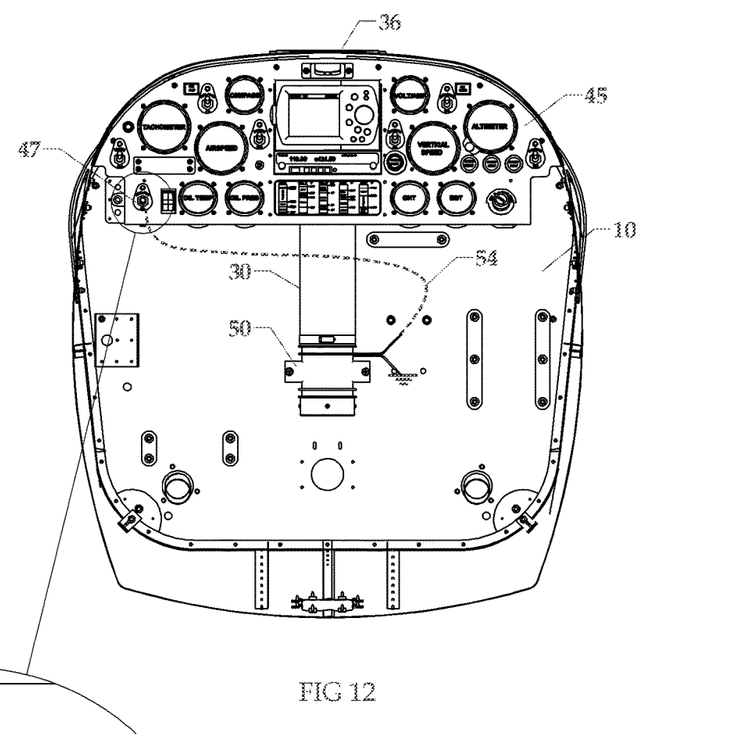
FIG. 12 is a front view of the forward portion of an aircraft cabin showing the instrument panel and part of the anti-fogging system of FIG. 1.
Figure 13:
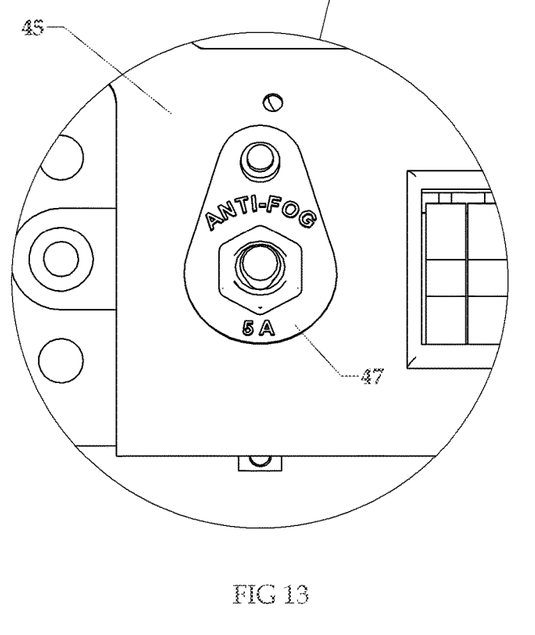
FIG. 13 is a close-up view of the switch shown in FIG. 12.

FIG. 2 is a cross-sectional view of the anti-fogging system showing the blower motor 51 and vanes 53 of blower 50. FIG. 2 also illustrates electrical leads 54 which connect fan motor 51 to switch 47 on instrument panel 45 as shown in FIGS. 12 and 13. Fan 50 draws air into inlet 52 and creates a forceful stream of air which travels up through air duct 30 and exits outlet 36. Baffles 35 of outlet 36 initially direct the forceful stream of air in the direction of arrow A shown in FIG. 2.

In location A in FIG. 1, the dashed lines are extensions of the baffles 35 of outlet 36. The dashed lines at A better illustrate that the baffles are directed rearwardly of windshield 20 so that the forceful stream of air is directed rearwardly of windshield 20 and not directly at the windshield 20. As illustrated in FIG. 1, the outlet stream of air is most preferably directed rearwardly of windshield 20 and forwardly of pilot P. For example, the air can be directed parallel to the angle of the windshield or at a lesser angle than the angle of the windshield, i.e. angled more rearwardly than the angle of the windshield, as measured by angle W in FIG. 3. The purpose of the present invention is to prevent moist exhaled air from directly reaching the windshield in order to avoid the fogging of the windshield by moist exhaled air, rather than trying to remove frost from a windshield by defrosting. Successful defrosting in a very cold climate requires heated air. The various embodiments of the present invention do not rely upon heated air or otherwise modifying the air, for example by dehumidification. Moist, exhaled air from the occupants is intercepted and urged upwardly and rearwardly away from the windshield as indicated by the extension of the dashed lines in FIGS. 1 and 3, as well as in FIGS. 14 and 15 described below. The present invention has been proven to work very effectively in preventing a cold windshield from fogging during pre-flight checks, taxiing and take-off in a cold climate. The baffles 35 shown in FIG. 2 are relatively long, however it is within the scope of the present invention to use baffles of different sizes, including baffles which are flush with dashboard 40. The relatively large baffles 35 shown in FIG. 2 illustrate the angular orientation of the baffles 35.

FIG. 3 is a close-up of the anti-fogging system illustrated in FIG. 1. The angular orientation of baffles 35 relative to windshield 20 is generally illustrated by the dashed lines at position A. In this illustrated embodiment, the baffles are positioned on angles to direct air rearwardly of windshield 20 and, most preferably, forwardly of the occupants. Ideally, the warm, moist exhaled air from the occupants is pushed toward the rear of the cabin away from windshield 20.

Figure 4:
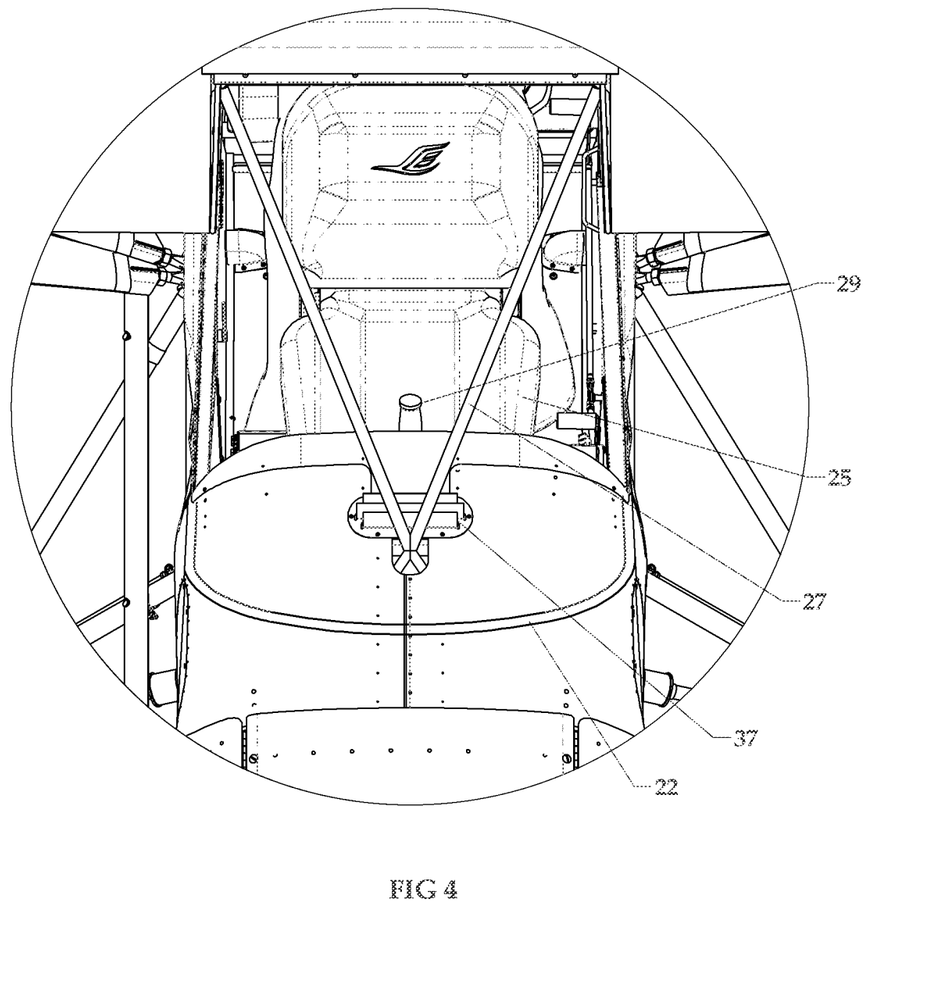
FIG. 4 is a top view showing the outlet of the embodiment of FIG. 1

FIG. 4 is a top perspective view of the forward pilot area of the cabin showing seat 25, control stick 29 and outlet baffle plate 37 which passes through dashboard 40 just aft of structural support struts 27 which are aft of windshield support 22 which seals the windshield to the fuselage.

Figure 5:
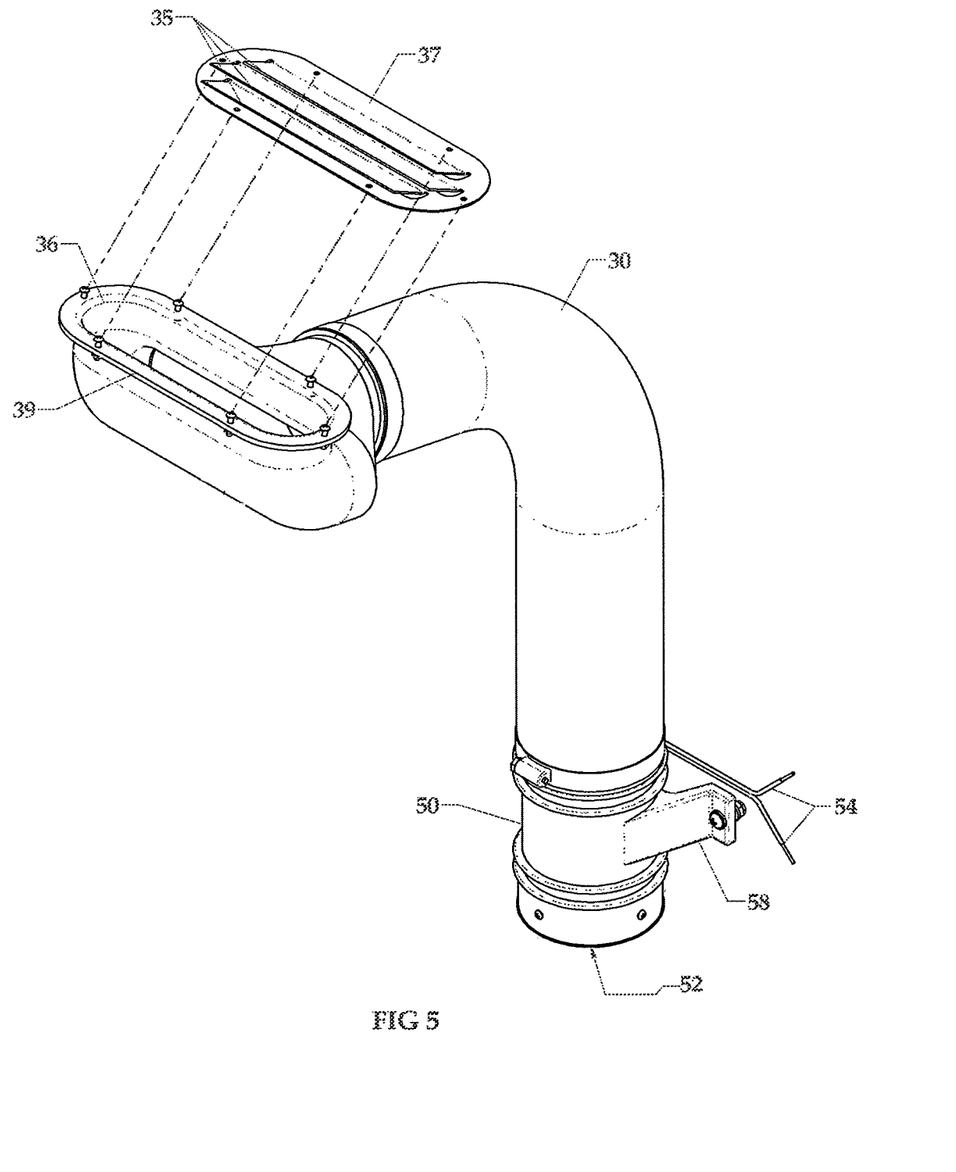
FIG. 5 is a partially exploded, perspective view of the blower and air conduit of FIG. 1.

FIG. 5 is a perspective view of the anti-fogging system shown in FIG. 1 prior to installation. As illustrated, fan 50 comprises mounting brackets 58 for mounting the fan on the firewall 10. Electrical leads 54 supply electricity to fan 50. As illustrated in FIG. 5, outlet baffle plate 37 comprising baffles 35 is connected to conduit outlet 36 with screws. The screws pass through outlet baffle plate 37, dashboard 40 and an upper flange 39 of air conduit 30. Outlet baffle plate 37 has baffles 35 which direct the out-flowing air in the direction of the dashed lines at location A, as shown in FIGS. 1-3.

One embodiment comprises an anti-fogging system in an air-cooled, piston powered single engine aircraft wherein the outlet of the air conduit comprises baffles angled away from said windshield.

In another embodiment, the baffles are disposed at an angle no closer to the windshield than parallel to the angle of the windshield. Alternatively, the baffles are angled at least 5° more rearwardly than the angle of the windshield or at least 10° more rearwardly than the angle of the windshield. The term "angle of the windshield" is used to indicate the rearward slope of that portion of the windshield which is on or closest to the centerline of the plane.

The windshield on the aircraft shown in FIGS. 1, 3, 14, and 15 is inclined at 35° from the dashboard; however, some airplanes have windshields inclined more or less than this angle. In one embodiment, the angle of the baffles is such that it directs the stream of air parallel to the windshield to minimize the losses of flow caused by the fins themselves. So in the case of a windshield angled 35° from the dashboard, baffles also angled at 35° from the dashboard optimize the performance of the blower by moving the air up and away from the windshield. In the alternative embodiments, the baffles on this particular plane would be angled no more than 30° or no more than 25° from the dashboard, respectively. The forwardmost air openings of outlet 36 or outlet baffle plate 37 are preferably spaced at least 3-5 inches from the base of the windshield.

Figure 6:
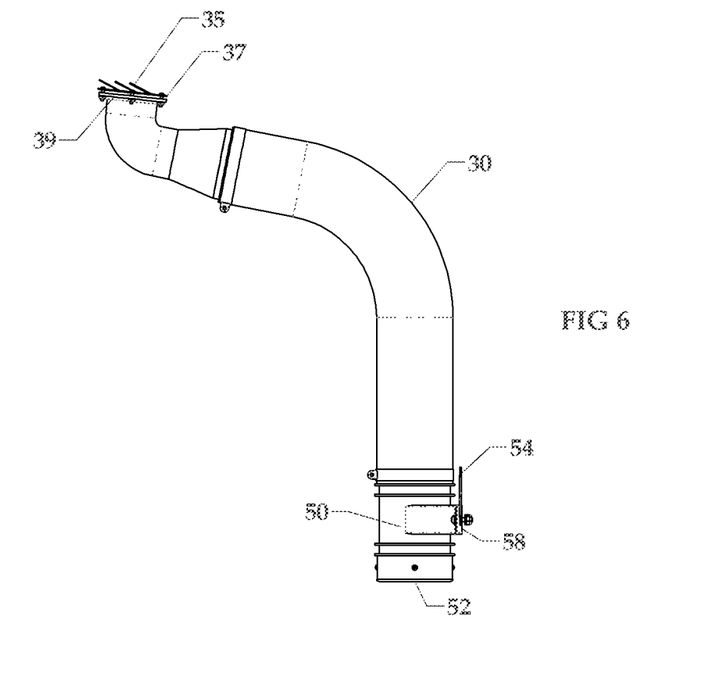
FIG. 6 is a right side view of the blower and air conduit shown in FIG. 1.
Figure 7:
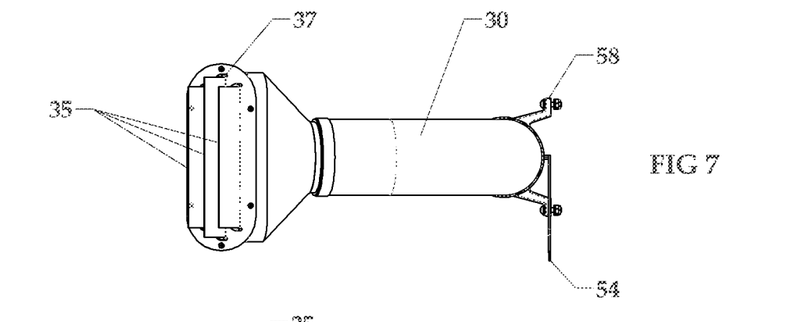
FIG. 7 is a top view of the blower and air conduit shown in FIG. 1.
Figure 8:
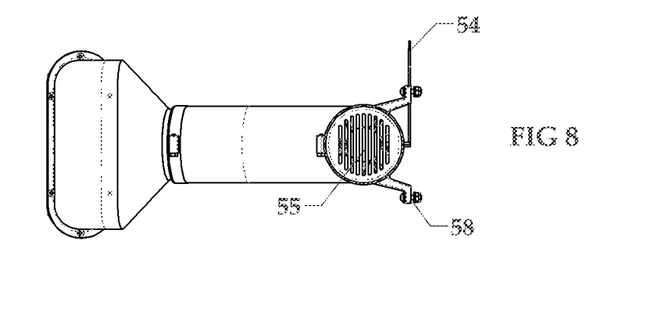
FIG. 8 is a bottom view of the blower and air conduit shown in FIG. 1.

FIG. 6 is a right side view of the anti-fogging device shown in FIG. 5 showing the baffles 35 of outlet plate 37 which is connected to upper flange 39 via screws, air conduit 30, blower 50, inlet 52, mounting brackets 58 and electrical leads 54. FIG. 7 is a top view of the anti-fogging device shown in FIG. 6. As shown in the bottom view of FIG. 8, the inlet end 52 of blower 50 comprises a screen 55 which prevents debris and other objects from being drawn into blower 50.

Figure 9:
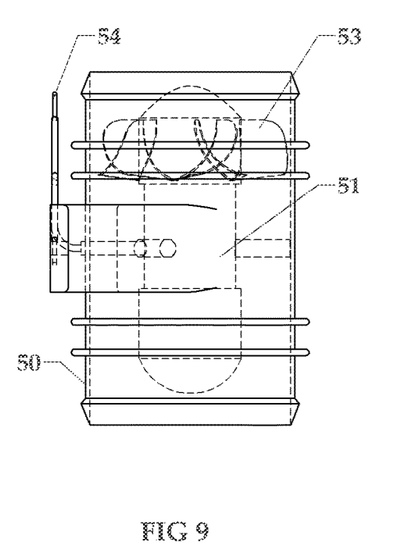
FIG. 9 is a side view of the blower of the embodiment of FIG. 1.
Figure 10:
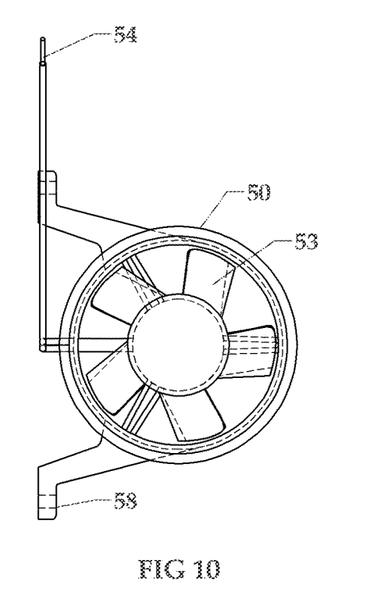
FIG. 10 is a top view of the blower of FIG. 1.
Figure 11:
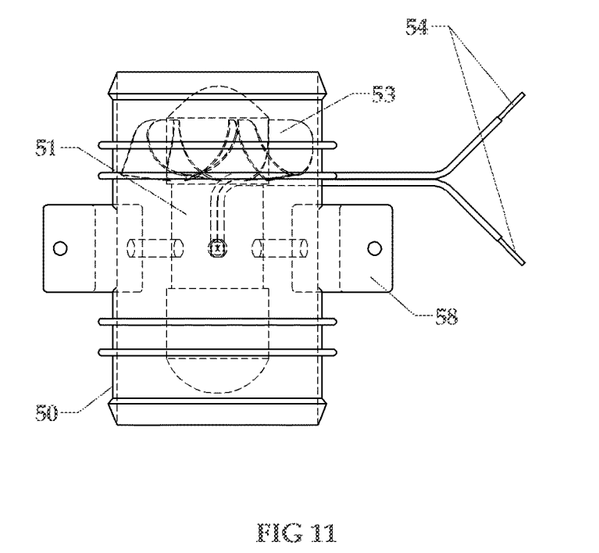
FIG. 11 is a front view of the blower of FIG. 9.

FIGS. 9, 10, and 11 are side, top, and front views, respectively, of blower 50 with the internal motor 51, vanes 53 and electrical connectors 54 shown in phantom in the blower housing. Blower 50 is preferably a light-weight, highly efficient axial vane blower which creates a forceful air flow of about 100 CFM, preferably about 120 CFM, for example, an Attwood Turbo 3000 in-line axial blade blower.

As noted above, the anti-fogging systems of the present invention do not contain any components which change the temperature or humidity of the ambient air.

FIGS. 12 and 13 are a front view (looking forwardly from the pilot's seat) and a partial close-up of the instrument panel 45 and aft side of firewall 10 in the forward section of the cockpit. FIG. 12 shows blower 50, the lower portion of air conduit 30, instrument panel 45 and outlet 36. As best illustrated in FIG. 12, leads 54 from blower 50 are connected to a switch 47 located on the instrument panel 45. The illustrated leads are illustrated in dashed lines to indicate that they are not exposed to avoid inadvertent damage during operation of the aircraft. FIG. 13 is a close-up view of anti-fogging system switch 47.

Figure 14:
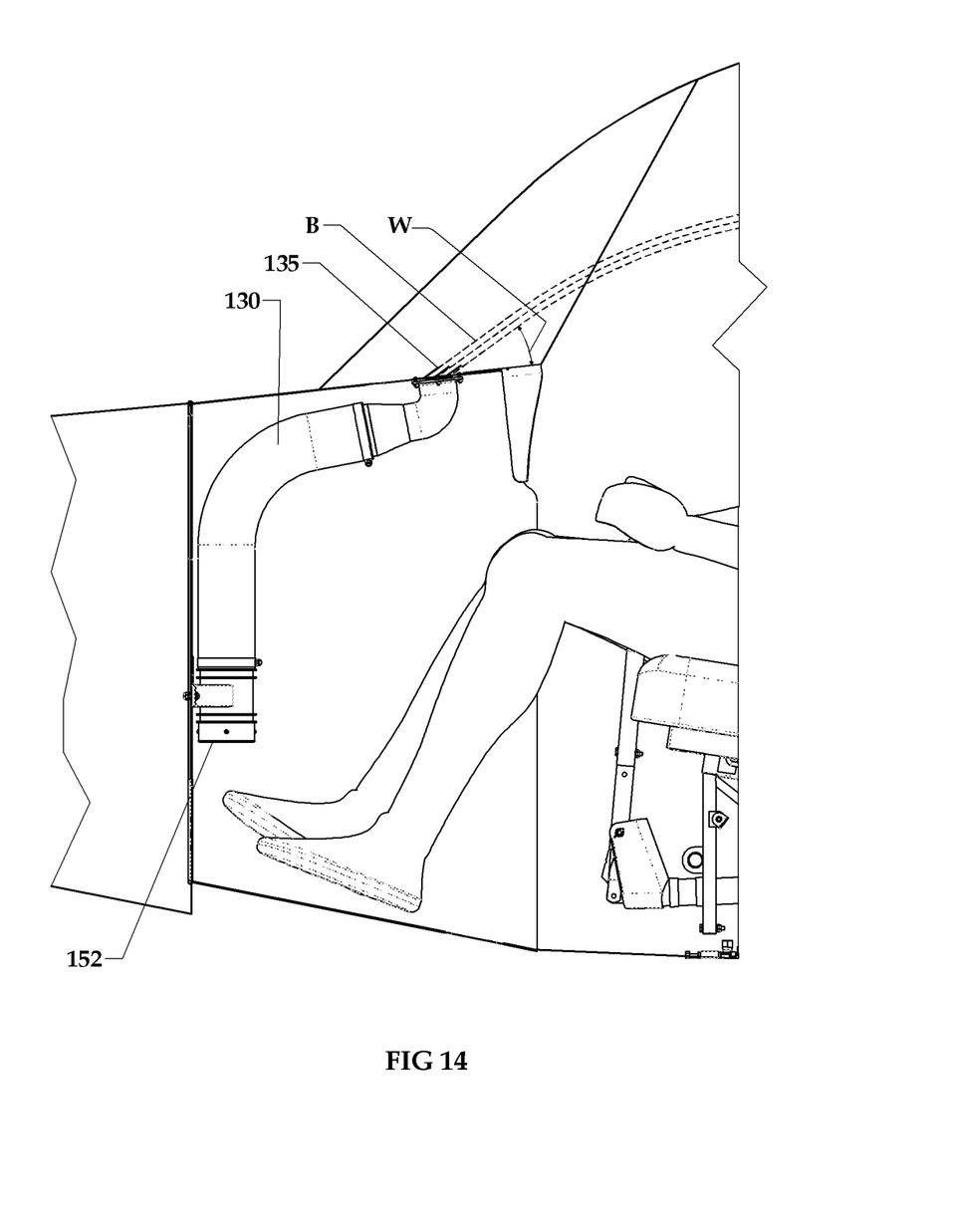
FIGS. 14 and 15 are cross sectional views of an alternative embodiment of the present invention.
Figure 15:
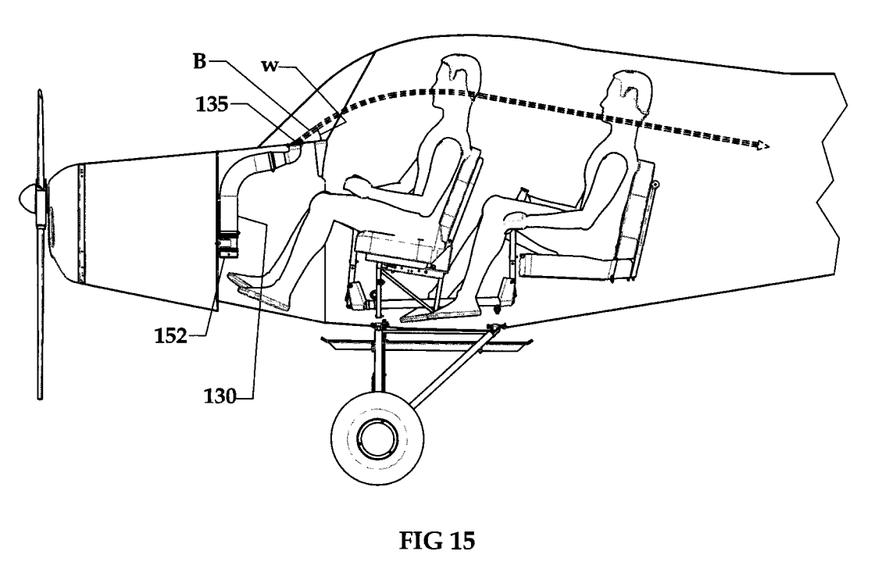

FIGS. 14 and 15 illustrate an alternative embodiment of the present invention that has a blower inlet 152 positioned higher than blower inlet 52 shown in FIG. 1. In the embodiment of FIG. 14, the actual blower can be positioned higher, the blower can be provided with a shorter housing, or a section of conduit 130 can be shorter in order to effectively raise the position of inlet 152 in the cabin. In order to maximize the efficiency of the blower, in this embodiment and all other embodiments of the present invention, it is preferable to make the conduits as short as possible while connecting the outlet with the desired inlet position. Since warm air rises, it is preferable that the inlets of the present invention be positioned below the level of the dashboard. Though not illustrated, a portion of a conduit can be provided below the blower.

The embodiment shown in FIGS. 14 and 15 comprises a baffle plate having baffles 135 which are angled more rearwardly than the angle of the windshield in order to direct the forceful stream of ambient air in the direction of the dashed lines at location B shown in FIGS. 14 and 15.

Figure 16:
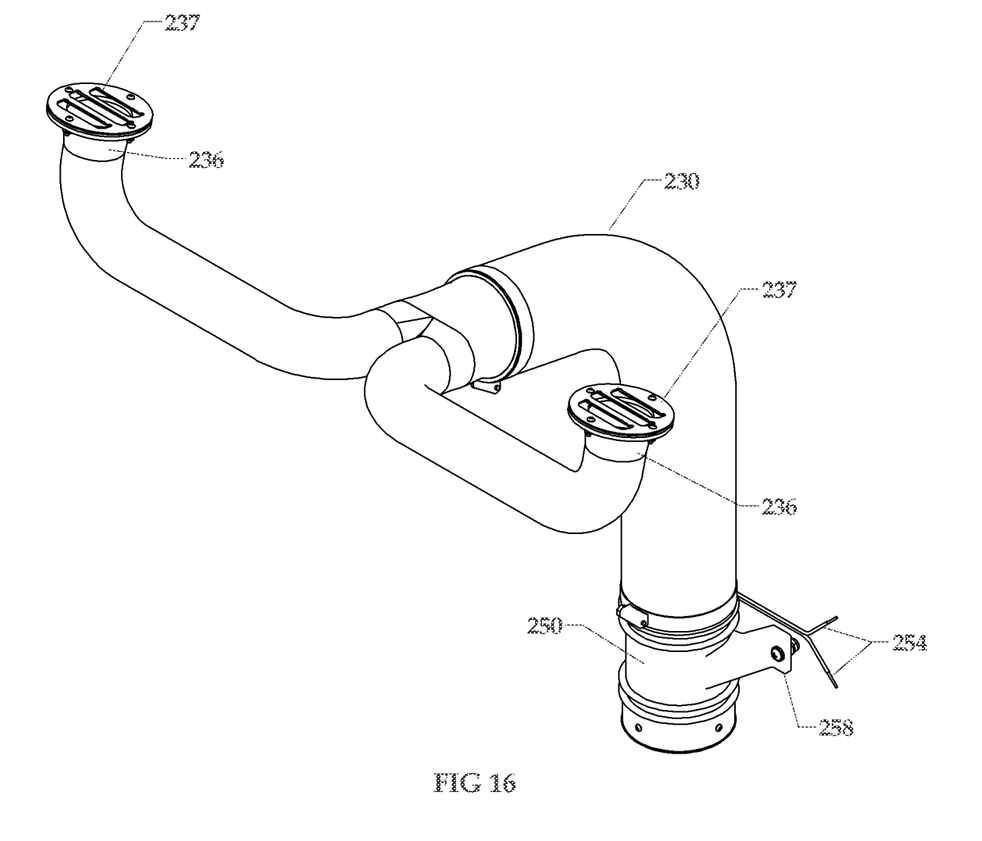
FIG. 16 is a perspective view of a blower and air conduits of a still further embodiment of the present invention comprising two outlets.

According to an alternative embodiment shown in FIG. 16, particularly used for wider planes such as a Cessna 172 or Piper Cherokee, the anti-fogging system comprises a plurality of blowers and/or air conduits and outlets. While a plurality of the blower/conduit arrangements shown in FIGS. 1-5 can be utilized at different locations along the width of a small aircraft, in order to save weight, it may be preferable to provide a single high volume blower 250 connected to a conduit 230 having a plurality of outlets. As shown in FIG. 16, an alternative embodiment of the present invention comprises a single blower 250 comprising leads 254 and mounting brackets 258 connected to a generally Y-pipe type air conduit 230 comprising two sets of outlets 236 and outlet baffle plates 237. This configuration saves weight and cost when compared to a system having separate blowers and conduits for each outlet. The blower is sufficiently powerful in terms of air output volume and velocity to intercept warm moist exhaled air from the occupants and preferably each outlet has an output of 80 CFM, most preferably at least 100 CFM.

The invention claimed is:

1. An anti-fogging system in an air-cooled piston engine aircraft, said aircraft comprising a cabin, a dashboard, an instrument panel comprising a rearwardly facing surface, and a windshield positioned at an angle to horizontal;
    said dashboard positioned at least partially below said windshield;
    said anti-fogging system comprising at least one electrically powered blower;
    said blower connected to at least one air conduit to collectively form a continuous air passage from an inlet end to an outlet end;
    said inlet end of said air passage positioned below said dashboard to receive untreated ambient cabin air;
    said outlet end of said air passage comprises baffles which are angled relative to the angle of the windshield to direct a stream of untreated ambient air rearwardly of said windshield and not toward said windshield;
    wherein said anti-fogging system does not comprise a heater or other mechanism for altering the temperature or humidity of the untreated ambient air; and
    wherein, in operation, said blower creates a stream of untreated ambient air which exits said outlet and directly intercepts exhaled air from an occupant to prevent exhaled air from reaching said windshield directly from an occupant.

2. The anti-fogging system in air-cooled, piston powered single engine aircraft according to claim 1 where said blower is positioned below said windshield and forwardly of said rearwardly facing surface of said instrument panel.

3. The anti-fogging system in an air-cooled, piston powered single engine aircraft according to claim 1 wherein said baffles are angled away from said windshield.

4. The anti-fogging system in an air-cooled, piston powered single engine aircraft according to claim 1 wherein said baffles are disposed parallel to the angle of the windshield.

5. The anti-fogging system in an air-cooled, piston powered single engine aircraft according to claim 1 wherein said baffles are angled at least 5° more rearwardly than the angle of the windshield.

6. The anti-fogging system in an air-cooled, piston powered single engine aircraft according to claim 1 wherein said baffles are angled at least 10° more rearwardly than the angle of the windshield.

7. The anti-fogging system in an air-cooled, piston powered single engine aircraft according to claim 1 wherein said outlet is disposed at least 20 cm above said inlet.

8. The anti-fogging system in an air-cooled, piston powered single engine aircraft according to claim 1 wherein said blower has a rated output of at least 100 CFM.

9. The anti-fogging system in an air-cooled, piston powered single engine aircraft according to claim 1 wherein said blower causes an output at said outlet of at least 80 CFM.

10. The anti-fogging system in an air-cooled, piston powered single engine aircraft according to claim 1 wherein said outlet end of said air passage is configured to direct said ambient air stream forwardly of an occupant's face.

11. The anti-fogging system in an air-cooled, piston powered single engine aircraft according to claim 1 wherein said outlet end of said air passage is configured to direct said ambient air stream upwardly.

12. An air-cooled, piston engine airplane comprising;
an air-cooled engine;
a firewall;
a cabin separated from said engine by said firewall;
a windshield positioned at an angle to horizontal;
at least one seat in said cabin for an occupant and positioned for supporting an occupant in a position to allow visibility through said windshield with an occupant's face positioned rearwardly of and spaced from said windshield;
a dashboard;
an instrument panel comprising a rearwardly facing surface; and
an anti-fogging system comprising at least one electrically powered blower located in said cabin,
said blower connected to at least one air conduit to collectively form a continuous air passage from an inlet end to an outlet end;
said inlet end of said air passage positioned below said dashboard to receive untreated ambient cabin air;
said outlet end of said air passage comprises baffles which are angled relative to the angle of the windshield to direct a stream of untreated ambient air rearwardly of said windshield, not toward said windshield, and forwardly of an occupant's face;
wherein said anti-fogging system does not comprise a heater or other mechanism for altering the temperature or humidity of the ambient air; and
wherein, in operation, said blower creates a stream of untreated ambient air which exits said outlet and directly intercepts exhaled air from an occupant preventing exhaled air from reaching said windshield directly from an occupant.

13. The air-cooled, piston powered single engine aircraft according to claim 12 wherein said baffles are angled rearwardly of the angle of the windshield.

14. The air-cooled, piston powered single engine aircraft according to claim 12 wherein said baffles are angled at least 5° more rearwardly than the angle of the windshield.

15. The air-cooled, piston powered single engine aircraft according to claim 12 wherein said baffles are angled at least 10° more rearwardly than the angle of the windshield.

16. The air-cooled, piston powered single engine aircraft according to claim 12 wherein said blower has a rated output of at least 100 CFM.

17. The air-cooled, piston powered single engine aircraft according to claim 12 wherein said blower causes an output at said outlet of at least 80 CFM.

* * * * *